United States Patent
Moeglein et al.

(10) Patent No.: US 8,731,537 B2
(45) Date of Patent: May 20, 2014

(54) WIRELESS COMMUNICATION DEVICES IN WHICH OPERATING CONTEXT IS USED TO REDUCE OPERATING COST AND METHODS FOR OPERATING SAME

(75) Inventors: Mark Leo Moeglein, Ashland, OR (US); Lionel Jacques Garin, Palo Alto, CA (US)

(73) Assignee: QUALCOMM Incorporated, San Diego, CA (US)

(*) Notice: Subject to any disclaimer, the term of this patent is extended or adjusted under 35 U.S.C. 154(b) by 124 days.

(21) Appl. No.: 13/242,682

(22) Filed: Sep. 23, 2011

(65) Prior Publication Data

US 2012/0252425 A1 Oct. 4, 2012

Related U.S. Application Data

(60) Provisional application No. 61/429,647, filed on Jan. 4, 2011.

(51) Int. Cl.
*H04M 3/00* (2006.01)

(52) U.S. Cl.
USPC ........... 455/418; 455/423; 455/425; 455/424; 455/522; 455/67.11; 455/67.14; 455/115.1; 455/115.2; 455/123.1

(58) Field of Classification Search
USPC .............. 455/423, 419, 418, 425, 424, 522, 455/67.11, 67.14, 115.1, 115.2, 123, 159.1
See application file for complete search history.

(56) References Cited

U.S. PATENT DOCUMENTS

| | | | |
|---|---|---|---|
| 6,912,386 B1* | 6/2005 | Himberg et al. | 455/423 |
| 2007/0239813 A1* | 10/2007 | Pinder et al. | 708/270 |
| 2008/0005055 A1* | 1/2008 | Horvitz | 706/62 |
| 2008/0126282 A1* | 5/2008 | Sinclair et al. | 706/21 |
| 2008/0143518 A1* | 6/2008 | Aaron | 340/540 |
| 2009/0055739 A1* | 2/2009 | Murillo et al. | 715/708 |
| 2009/0280775 A1 | 11/2009 | Moeglein et al. | |
| 2011/0099142 A1* | 4/2011 | Karjalainen et al. | 707/600 |
| 2011/0191279 A1* | 8/2011 | Kim et al. | 706/46 |
| 2011/0269452 A1* | 11/2011 | Roumeliotis et al. | 455/424 |
| 2011/0310751 A1* | 12/2011 | Song et al. | 370/252 |
| 2012/0284593 A1* | 11/2012 | Rodriguez | 715/201 |

OTHER PUBLICATIONS

Capra L., et al., "Q-CAD: QoS and Context Aware Discovery Framework for Adaptive Mobile Systems", Technical Report RN/04/18, University College London, [Online] Sep. 30, 2004, pp. 1-10, XP002664415, Retrieved from the Internet: URL:http://www.cs.ucl.ac.uk/staff/L.capra/publications/icps05ex.pdf> [retrieved on Nov. 25, 2011] pp. 1-6.

Chen G., et al., "A Survey of Context-Aware Mobile Computing Research", Internet Citation, [Online] pp. 1-16, XP002227105, Retrieved from the Internet: URL: http://wwwl.cs.dartmouth.edu/~dfk/papers/chen:survey-tr.pdf> [retrieved on Jan. 14, 2003] pp. 1-11.

International Search Report and Written Opinion—PCT/US2012/020228—ISA/EPO—Apr. 25, 2012.

Kang S., et al., "Orchestrator: An active resource orchestration framework for mobile context monitoring in sensor-rich mobile environments", Pervasive Computing and Communications (PERCOM), 2010 IEEE International Conference on, IEEE, Piscataway, NJ, USA, Mar. 29, 2010, pp. 135-144, XP031677613, ISBN: 978-1-4244-5329-0, pp. 135-140.

* cited by examiner

*Primary Examiner* — Kwasi Karikari
(74) *Attorney, Agent, or Firm* — Jennifer M. Pascua

(57) ABSTRACT

A mobile device has operating resources available to it. A measurement generator provides measurements of the operating resources and a context awareness engine identifies which of the operating resources may be efficiently utilized by a service application in view of context conditions in which the mobile device is operating. A selection controller selects, based on the measurements, at least one of the identified operating resources for use by the service application to improve or optimize a cost of the mobile device.

18 Claims, 7 Drawing Sheets

WIRELESS COMMUNICATION DEVICES IN WHICH OPERATING CONTEXT IS USED TO REDUCE OPERATING COST AND METHODS FOR OPERATING SAME

CROSS REFERENCE TO RELATED APPLICATION

The present application claims the benefit of U.S. provisional patent application No. 61/429,647 filed Jan. 4, 2011, in the names of MOEGLEIN et al., the disclosure of which is expressly incorporated by reference herein in its entirety.

BACKGROUND

1. Field

The present disclosure relates to improvements in wireless communication devices and systems, and methods for operating same, and more particularly to monitoring operating contexts of the devices to reduce cost and improve the efficiency of operating the devices.

2. Background

Wireless mobile devices are becoming more ubiquitous all over the world. As increasing numbers of people are carrying and using such mobile devices, and the devices' complexity and computing power grows, their operating context is becoming of increased interest. The operating context of a mobile device has three main components: the physical environment in which the mobile device is operating, the operating states, conditions, and capabilities of the mobile device, and the applications or activities in which the mobile device is engaging.

The physical environment in which the mobile device is operating includes such factors as the location type, whether the mobile station is indoors or outdoors, whether it is operating in a vehicle, whether the vehicle is in the open or in a tunnel or other signal inhibiting structure, and the like. Other physical environment factors include, for example, the direction the mobile device is facing, whether the mobile device is moving or still, and if it is moving, at what speed and in what direction. Still other physical environment factors may include, for instance, weather conditions surrounding the mobile device, such as whether it is raining, foggy, sunny, windy, and so on.

The operating states, conditions, and capabilities of the mobile device include such factors as the equipment installed on the mobile device. Examples of such equipment include the battery, the memory, the display, the speakers or earphones, a satellite positioning system (such as GPS) engine, multimedia capabilities, the processor power and speed, and the like. The states, conditions, and capabilities may also include, for example, the state of charge of the battery, the brightness capabilities of the display, whether the brightness is adjustable, and so on.

The applications or activities of the mobile device may include, for example, whether the mobile device is running a navigation program, tracking or following people, running a gaming program, whether running programs are local or interactive with users of other mobile devices, and so on. Other applications or activities may include running multimedia programs, for example, receiving, transmitting, or displaying video and audio signals. Still other sophisticated examples of applications or activities may include such things as artificial intelligence and learning applications, and applications in which sophisticated decision making capabilities are needed, such as reminding a user that he is near a grocery store and his grocery list includes bread and milk, or asking a user who is stuck in traffic and will be late to a meeting if the mobile device should send a notification to the other meeting participants that the user will be late, and by how long.

Even though technological improvements to mobile devices become increasingly powerful, mobile device capabilities are still limited. For example, battery capacity is ever increasing, but operating programs such as navigation or multimedia applications require significant power which in turn limits the operating time for such applications or limits simultaneous operation of other applications. Bright daylight displays are becoming widely available with low power requirements, but night-time displays still use significant power. Mobile devices are not sufficiently self-aware to govern their behavior to conserve resources. For example, if a mobile device is in a noisy environment that makes detecting incoming calls by the user difficult, the mobile device may nevertheless continue operating the ringing at full power without taking into account its environment.

Most solutions to this problem are ad hoc. For example, a typical application operates its own interfaces to various components on a mobile device, rather than interacting with a single point of control. This configuration means that each application considers operating conditions independently. Although some efforts have been made to sense a mobile device's environment, and alter the mobile device's operation in response, holistic optimization of resources has not been addressed in a satisfactory manner. For example, it has been proposed to sense indoor and outdoor cell phone environments using phone sensors and inference analyzers. It has also been proposed to sense a sound level to put a phone into vibrate mode, and the like.

SUMMARY

Offered is a mobile device capability that can track the operating context of a mobile device through a central control engine, and for any particular action may select a desired set of operating conditions or resources and configure the mobile device accordingly. The aspects of the present disclosure described collect information regarding a mobile device's operating conditions, process the information, and determine desired operating conditions based on the operating context. An application can thus interface with the central control engine, rather than having to interface with each of the sensors/measurement devices, etc. that would be used by the application to obtain the context information on its own.

Offered is a mobile device including a measurement generator to provide freely available measurement information of the operating resources. The mobile device may also include an inference engine to generate inferred context information from the freely available measurement information. The mobile device may also include a context awareness engine to access the freely available measurement information and/or the inferred context information to determine context conditions of the mobile device. The context awareness engine may also identify at least one of the operating resources as one or more candidate resources for a service application based on the determined context conditions. The context awareness engine may be configured to evaluate the candidate resource(s) using evaluation metrics to measure cost and/or effectiveness of the candidate resource(s). The context awareness engine may also be configured to select at least one of the candidate resources for use by the service application based on the evaluation metrics.

Offered is a method of operating a mobile device configured to access operating resources. The method includes determining at least one context condition of the mobile device using freely available measurement information of the operating resources and/or inferred context information obtained from the freely available measurement information. The method also includes, upon initiation of a service application, determining at least one candidate operating resource for the service application based on the context conditions. The method further includes measuring cost and/or efficiency of the candidate operating resource(s) based on the context conditions. The method still further includes selecting at least one of the candidate operating resources based on the measuring.

Offered is a mobile device configured to access operating resources. The mobile device includes means for determining at least one context condition of the mobile device using freely available measurement information of operating resources and/or inferred context information obtained from the freely available measurement information. The mobile device also includes means for, upon initiation of a service application, determining at least one candidate operating resource for the service application based on the context conditions. The mobile device further includes means for measuring cost and/or efficiency of the candidate operating resource(s) based on the context conditions. The mobile device still further includes means for selecting at least one of the candidate operating resources based on the measuring.

Offered is a computer program product including a non-transitory computer-readable medium having program code recorded thereon. The program code includes program code to determine at least one context condition of a mobile device using freely available measurement information of operating resources and/or inferred context information obtained from the freely available measurement information. The program code also includes program code to, upon initiation of a service application, determine at least one candidate operating resource for the service application based on the context conditions. The program code further includes program code to measure cost and/or efficiency of the candidate operating resource(s) based on the context conditions. The program code still further includes program code to select at least one of the candidate operating resources based on the measuring.

Offered is a mobile device configured for wireless communication. The mobile device includes a processor(s) and a memory coupled to the processor(s). The processor(s) is configured to determine at least one context condition of the mobile device using freely available measurement information of operating resources and/or inferred context information obtained from the freely available measurement information. The processor(s) is also configured to, upon initiation of a service application, determine at least one candidate operating resource for the service application based on the context conditions. The processor(s) is further configured to measure cost and/or efficiency of the candidate operating resource(s) based on the context conditions. The processor(s) is still further configured to select at least one of the candidate operating resources based on the measuring.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present teachings, reference is now made to the following description taken in conjunction with the accompanying drawings.

In the various figures of the drawing, like reference numbers are used to denote like or similar parts or functions.

DETAILED DESCRIPTION

Definitions

Figure 1:
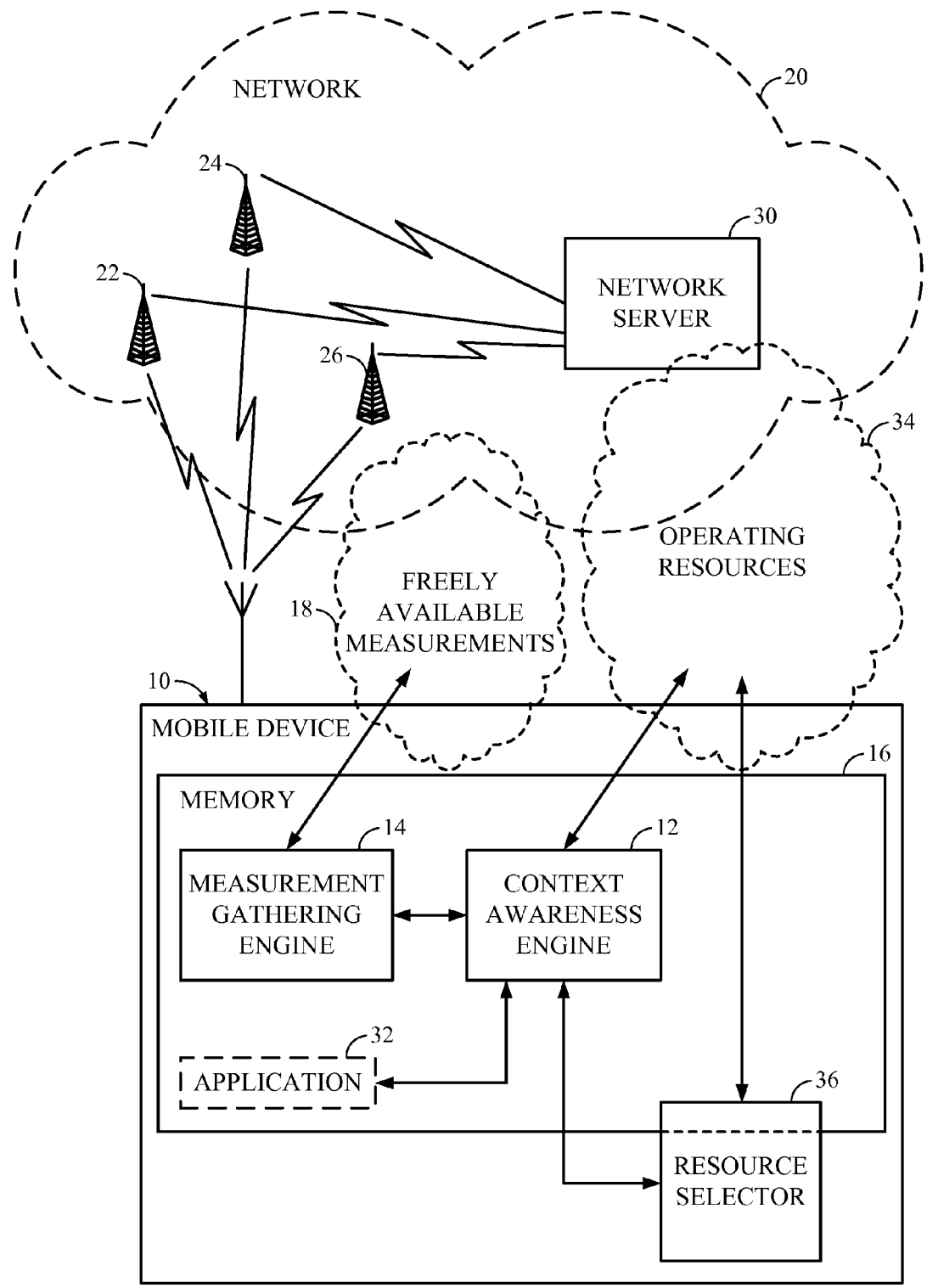
FIG. 1 is a block diagram of a mobile device in a wireless network environment, showing a context-aware mode of operation of the mobile device.

A number of terms are defined below and used as defined in the application.

Freely available measurement—A measurement that is readily available within the mobile device. Many freely available measurements are already available in the mobile device for communications purposes. For example, a freely available measurement would include such information as the ID of one or more serving communication resources with which the device is wirelessly associated. The ID can be read from a received signal. A serving communication resource may be, for example, a transmitter with which the mobile device is in communication. A freely available measurement may also include signal strength and phase information that can be relatively easily acquired or determined. Freely available measurements may also include "serving" and "non-serving" measurements. Freely available "serving" measurements includes, for example, unique ID information that is uniquely associated with a given ID in a device almanac (defined below). Freely available non-serving measurements may include, for example, a non-unique ID such as a pseudo noise (PN) offset for a code division multiple access (CDMA) signal, a frequency for global system for mobile communications (GSM), and analogous information for other air interfaces. Many other examples of freely available measurements exist. For example, in wide area network (WAN) systems a pilot strength measurement message (PSMM) in CDMA2000 systems, a measurement results list (MRL) in universal mobile telecommunications systems (UMTS), common reference signal (CRS) measurements of long term evolution (LTE) systems, and a network measurement report (NMR) in GSM systems are examples of freely available measurements.

Context of the mobile device—The measurable, derivable, deducible, or inferable factors by which the environment, setting, and/or location type of a mobile device may be modeled. The context may be determined from one or more freely available measurements, operating conditions, or other inputs. For example, the inference that a mobile device is inside or outside might be based on the color temperature of a photograph taken by a camera phone in conjunction with the time of day. The inference could, perhaps also account for local weather and temperature. The context may also include the probable number of measurements the mobile device is likely to receive if it performs an initial or deeper search for any particular measurement type. For example, a pilot strength measurement message (PSMM) might include enough information for the mobile device to infer how many signal measurements are likely, particularly when viewed in combination with a device almanac.

Cost or operating cost—A measure of the resources used in operating the mobile device, which need not be monetary; for example, the time and/or power required for a mobile device to accomplish a particular task. Cost can also reflect the degree of use of computing or communication resources.

Derived or inferred information—Information not directly available, but derived or inferred from freely available measurements or directly available information. An example of derived or inferred information is a determination or likelihood that a mobile device is in a moving road-based vehicle (car, bus, or the like) based on input from a mobile device sensor, such as an accelerometer or gyroscope. The sensor indicates the mobile device is moving at a speed greater than a walking speed but less than an aircraft speed. Another example of derived or inferred information is a determination of the likelihood that a mobile device is outside at night because the mobile device's camera senses low or no light conditions and the mobile device time (which itself can be derived from a wireless base station or GPS satellite data) is after sunset, based on almanac data received from a network data source.

Device almanac—A database containing information relevant to a specific device or devices. For example, in a GPS satellite navigation context, the satellite almanac may be a set of parameters included in the GPS satellite navigation message that a receiver uses to predict the approximate location of a satellite. The almanac may also contain information about other satellites in the constellation. In a cellular communication system context, the almanac may be a database listing the transmitter signals the device can receive. The almanac may also contain, for instance, the locations of base stations with which the wireless device can communicate.

Effectiveness—The efficiency by which a mobile device can accomplish a particular task, or the degree of certainty achievable by a mobile device in delivering a particular result.

Example or exemplary—The words "example" or "exemplary" are used to mean "serving as an instance, illustration, nature, or character of the rest." Any configuration or aspect described herein as "an example" or "exemplary" is not necessarily to be construed as preferred or advantageous over other configurations.

External mobile device resources—Resources external to the mobile device. External mobile device resources may include, for example, network resources, external transmitter almanacs, terrain elevation data, satellite almanac and ephemeris data, weather and forecast data, timing services, maps, applications, and application programming interfaces (APIs) that may be downloaded from a network server, and the like.

Internal mobile device resources—Resources internal to the mobile device. Internal mobile device resources may include, for example, the capacity of a mobile device to perform certain functions. An example of an internal mobile device resource may be the source supplying power to the device, which may be for instance, a constant power supply, one or more batteries, and the like. Other examples of internal mobile device resources may be a memory/storage and how much memory capacity is available for storing new information; an image acquisition device or camera; a microphone; a speaker and its volume capabilities; a user input device, such as a keypad or touch-screen; a thermometer; a processor and its processing speed and capacity; sensors, such as accelerometers, gyroscopes, magnetometers, pressure sensors, humidity sensors, and the like.

Location type of the mobile device Includes the character or characteristics of the location of the mobile device, such as indoors or outdoors; population density, transmitter or base station density; foliage levels; terrain undulation (flat, rolling hills, mountainous); light levels (sunny vs. shaded); color temperature; context probability, for example, normal or unusual context; road trip indication; likelihood of request; likelihood of context change; dynamics indicators, for example, static, standing still, walking, city driving, highway driving, flying, over water, and the like; highway or freeway speed indicator; motion levels; mobile status; proximity to transmitters; predicted signal strengths and connection success rates; proximity profiles (sonar); line-of-sight probabilities to base stations, transmitters, or other object; a multipath signal condition, which may be, for example, further quantified by a specific numeric scale or by discrete multipath types; and the like.

Measurement generator—A device (which may be executed in hardware, software, firmware, or any combination thereof) that can sample or query a myriad of operating resources available to a mobile device. The measurement generator is capable, for example, of measuring functions, features, capacities, or the like, that can be measured and reported, and returning a measurement value indicating a state of the sampled or queried resource. For example, a measurement generator may measure and report a battery capacity, or a measurement generator may check and report whether a display is on or off. A measurement generator, for example, may provide an indication whether signals from a particular satellite or ground transmitter are available, the phase of the signals, the signal strength of the signals, and so on.

Mobile device—A "mobile device," sometimes also referred to as a "mobile station," refers to a device such as a cellular or other wireless communication device, personal communication system (PCS) device, personal navigation device (PND), Personal Information Manager (PIM), Personal Digital Assistant (PDA), laptop computer, tablet computer, or other suitable device capable of receiving wireless communication signals, navigation signals, or both. The term "mobile station" includes devices which communicate with a personal navigation device (PND), such as by short-range wireless, infrared, wireline connection, or other connection, regardless of whether satellite signal reception, assistance data reception, or position-related processing occurs at the device or at the PND. "Mobile station" also includes devices, including wireless communication devices, computers, laptops, and the like, which are capable of communication with a server, for example, via the Internet, Wi-Fi, or other network, regardless of whether satellite signal reception, assistance data reception, or position-related processing occurs at the device, at a server, or at another device associated with the network. Any operable combination of the above is also considered a "mobile device."

Multipath—A signal condition resulting from received signals having traveled different propagation paths. In the radio channel, the multipath is created by reflection of the signal from obstacles in the environment, such as buildings, trees, cars, and people. In general, the radio channel is a time varying multipath channel due to the relative motion of the structures that create the multipath. For example, if an ideal impulse is transmitted over the time varying multipath channel, the received stream of pulses would change in time location, attenuation, and phase as a function of the time when the ideal impulse was transmitted. One characteristic of a multipath channel is the time spread introduced in a signal transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

Operating resources—Internal mobile device resources, external mobile device resources, and centralized resources.

Optimize or optimizing—To configure a mobile device so the mobile device will function in an effective manner based upon predefined criteria to reach desired cost and effectiveness goals. This can be done in a number of ways. For example, the context engines may continuously monitor and readjust the operating parameters of a mobile device with changing conditions. Or, the operating parameters of a mobile device may be initialized according to a configuration that changes in a predictable manner. Or, the operating parameters mobile device may be configured on a scheduled basis, and so on. The term "optimize" or "optimizing" is not intended to be necessarily limited to mobile device operations in the absolute, most efficient manner for a particular operating resource; however, it is contemplated that optimizing may achieve a level of operation, based on considerations and possible tradeoffs of the freely available measurements, costs, operating resources, and context of the mobile device, that tends to reduce or minimize cost and increase or maximize effectiveness.

Transmitter Almanac—Information related to signals a particular mobile device can receive.

DETAILED DESCRIPTION

In one configuration of the devices and methods described herein, a context awareness engine maintains a current context profile of the mobile device. The context profile may be continuously updated based on information available to the awareness engine. The awareness engine may use freely available measurements, and may decide whether to augment those freely available measurements based upon the expected cost and effectiveness of the various measurement types that might be requested.

FIG. 1 illustrates a block diagram of a mobile device 10 in a wireless network environment. FIG. 1 illustrates components for a context-aware mode of operation of the mobile device 10. The mobile device 10 includes, among other things, a context awareness engine 12 and a measurement gathering engine 14. The context awareness engine 12 and measurement gathering engine 14 may be implemented in hardware, software, firmware, or a combination thereof. In the configuration shown, they are software implemented, and contained, for example, in a memory 16 of the mobile device 10.

The measurement gathering engine 14 maintains a current profile of freely available measurements, conceptually illustrated by the cloud 18. As illustrated, the freely available measurements may include measurements from components in the mobile device 10, the wireless network 20 with which the mobile device 10 is associated, and any other available source.

The wireless network 20, among other things, includes base stations 22, 24, and 26 and a network server 30, which at least in part controls communications between the wireless network 20 and mobile device 10. The wireless network 20 may be implemented as a part of various wireless communication networks, such as a wireless wide area network (WWAN), a wireless local area network (WLAN), a wireless personal area network (WPAN), and so on.

A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The wireless network 20 may also be implemented as a part of a /WLAN or other wireless network. In addition to WLAN signals, the mobile device 10 may also receive signals from satellites (not shown), which may be from a Global Positioning System (GPS), Galileo, GLONASS, NAVSTAR, QZSS, a system that uses satellites from a combination of these systems, or any Satellite Positioning System (SPS) developed in the future, each referred to generally herein as a Satellite Positioning System (SPS) or GNSS (Global Navigation Satellite System).

The wireless network 20 may also be implemented as a part of a network that includes pseudolites or in a combination of systems that includes pseudolites, or as a part of a network that includes femto cells, or as a part of a combination of systems that includes femto cells.

In the configuration illustrated in FIG. 1, the mobile device 10 is running a particular application 32. The context awareness engine 12 is aware of the execution of the application 32. The application 32 may be any application that can be run by the mobile device 10, such as an internal application to operate a cell-phone camera, a downloadable application like a navigation service, a service API such as an augmented reality service, or the like. Based (at least in part) on the particular application 32, the context awareness engine 12 determines which operating resources, conceptually illustrated by the cloud 34, are desired for improved cost and efficiency. The context awareness engine 12 activates the resource selector 36 to activate or engage the selected operating resources. It should be noted that the operating resources, as illustrated, may be resources in the mobile device 10, the wireless network 20, or elements thereof, such as the network server 30, or elsewhere.

Figure 2:
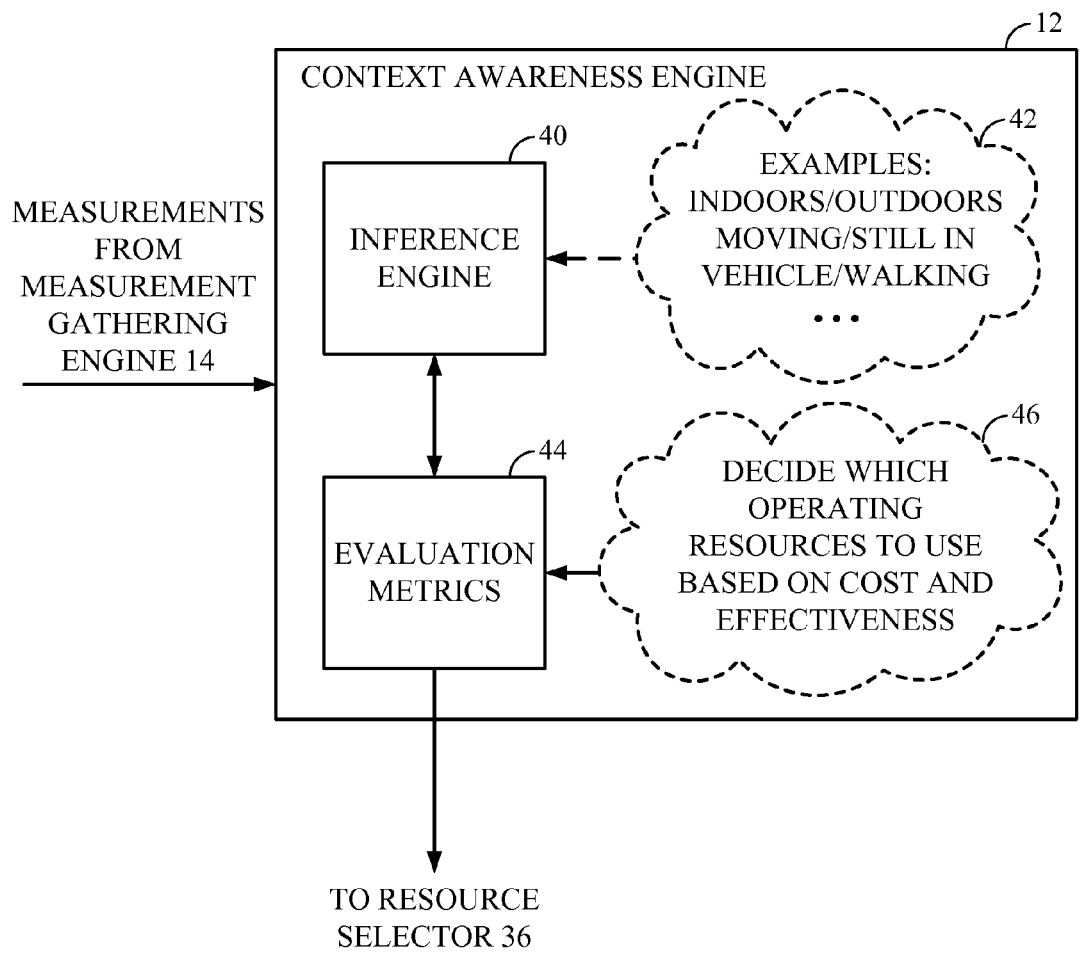
FIG. 2 is a block diagram showing a context awareness engine and its general interface with a measurement gathering engine and a resource selector.

FIG. 2 shows a block diagram of additional details of the context awareness engine 12 of FIG. 1. As shown, the context awareness engine 12 interfaces with the measurement gathering engine 14 and the resource selector 36. The measurement gathering engine 14 gathers, collects, measures or otherwise acquires freely available measurements and sends them to the context awareness engine 12. The data regarding freely available measurements may be regularly, and possibly continuously, updated by the measurement gathering engine 14.

The context awareness engine 12 may use freely available measurements to make inferences about the context of the mobile device. An inference engine 40 makes the inferences. Examples of inferences are shown in cloud 42 and include, for instance, whether the mobile device is indoors or outdoors, whether it is moving or still, whether it is in a vehicle or with a walking user, and so forth. It should be noted that inferences can be drawn not only from freely available information, but from previously drawn inferences and combinations of previously drawn inferences and freely available information.

The freely available measurements and inferences to be drawn may be dependent upon the particular application being executed by the mobile device. Potential inferences may be specified or predefined by the application itself, the mobile device manufacturer, the user, or some other source. In some instances, potential inferences may be self-learned by the context awareness engine 12.

Once the freely available measurements have been identified and the inferences generated, operating resources can be selected that achieve a desired cost and effectiveness of operating the mobile device. The context awareness engine 12 selects using evaluation metrics 44. The evaluation metrics 44 may be predefined or may be dynamically generated based on mobile operating conditions or other considerations. The evaluation metrics 44 are used to decide which operating resources to use, based on the cost and effectiveness of using the particular resources, as suggested by the cloud 46. Which specific operating resources to use in particular contexts may be predefined by the application itself, the mobile device manufacturer, the user, or some other source. In some instances, operating resources to be used may be self-learned by the context awareness engine 12 using, for example, an expert system. The self learning could also be based on the degree of membership in membership functions of a fuzzy logic control engine, or the like. Based on the identification of the operating resources needed, the context awareness engine 12 notifies the resource selector 36 which operating resources to use to achieve a desired cost and effectiveness for the mobile device.

It should be appreciated that there are several different types of costs associated with operation of a mobile device. One example is power. For example, a mobile device may become low in battery power, making battery power more precious, thereby increasing the cost of battery power. On the other hand a mobile device may have sufficient remaining battery power, reducing the cost of using the power.

Another type of cost is associated with acquiring freely available measurements. Typically, this cost would be low, primarily associated with the cost of maintaining an almanac for the freely available measurements in the mobile device and the computing power required by, for example, the navigation engine. Freely available measurements are unlikely to be as sensitive as other measurements that might be available (for example, from a specialized search for navigation purposes). This is the case because the mobile device is primarily concerned with the strongest signals it can acquire and therefore a communications resource is unlikely to search with great sensitivity. Increasing that sensitivity comes at a cost to the resources of the mobile device.

The cost associated with acquiring and maintaining certain information on the mobile device may not necessarily be low. For example, in some configurations, it may be desired to acquire and maintain a transmitter almanac, sometimes simply referred to as "almanac," to provide information related to signals the mobile device can receive. This almanac may be self-learned on the mobile device, or it may be provided by one or more servers in the wireless network. In any case, maintaining a transmitter almanac on the device can be costly, in terms of both communications resources and storage resources.

Figure 3A:
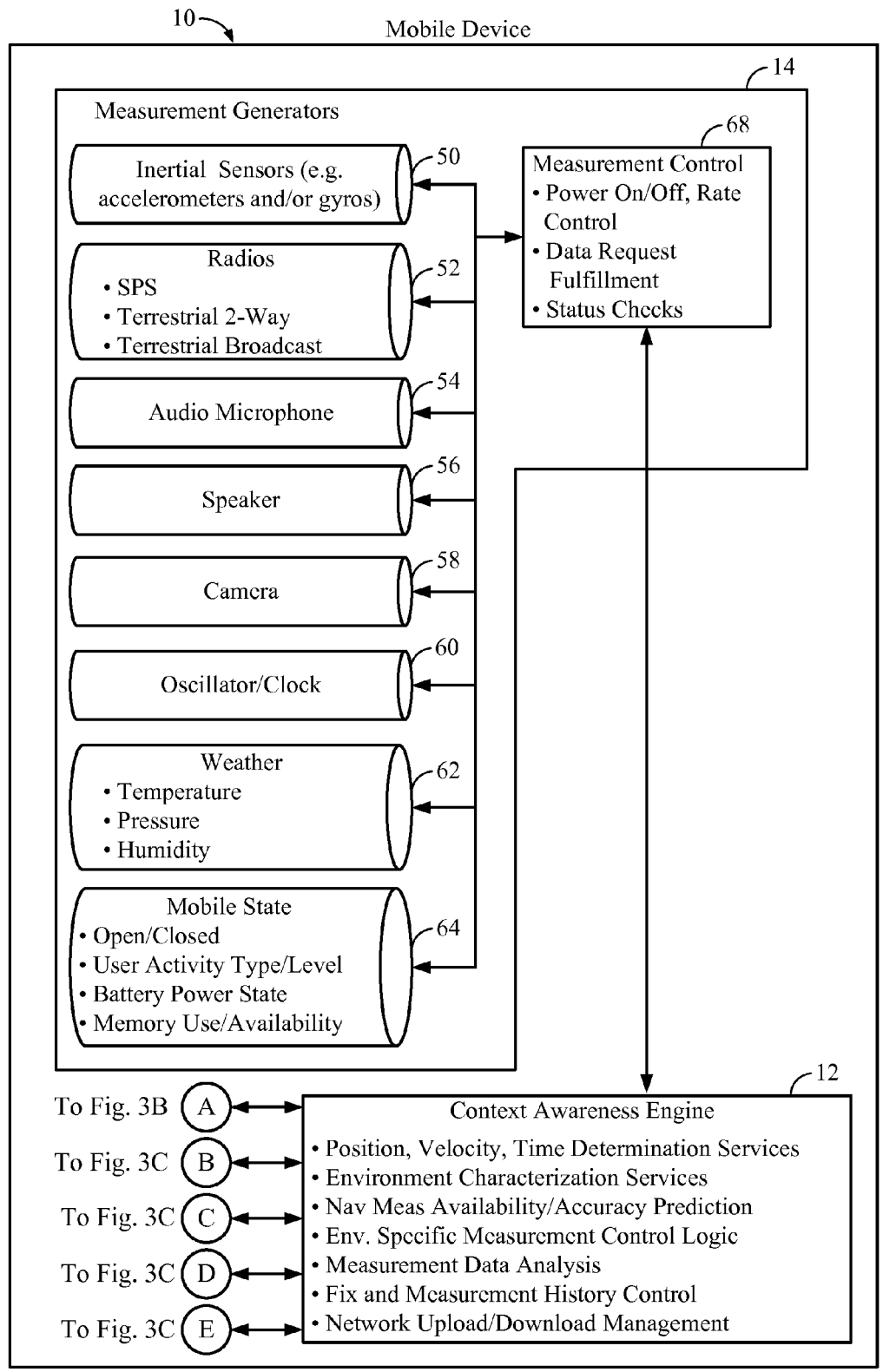
FIGS. 3A-3C are block diagram of an exemplary mobile device and its supporting network, illustrating an example of functional allocations to enable selection of mobile device operating resources for optimizing its cost and performance in view of its operating context.
Figure 3B:
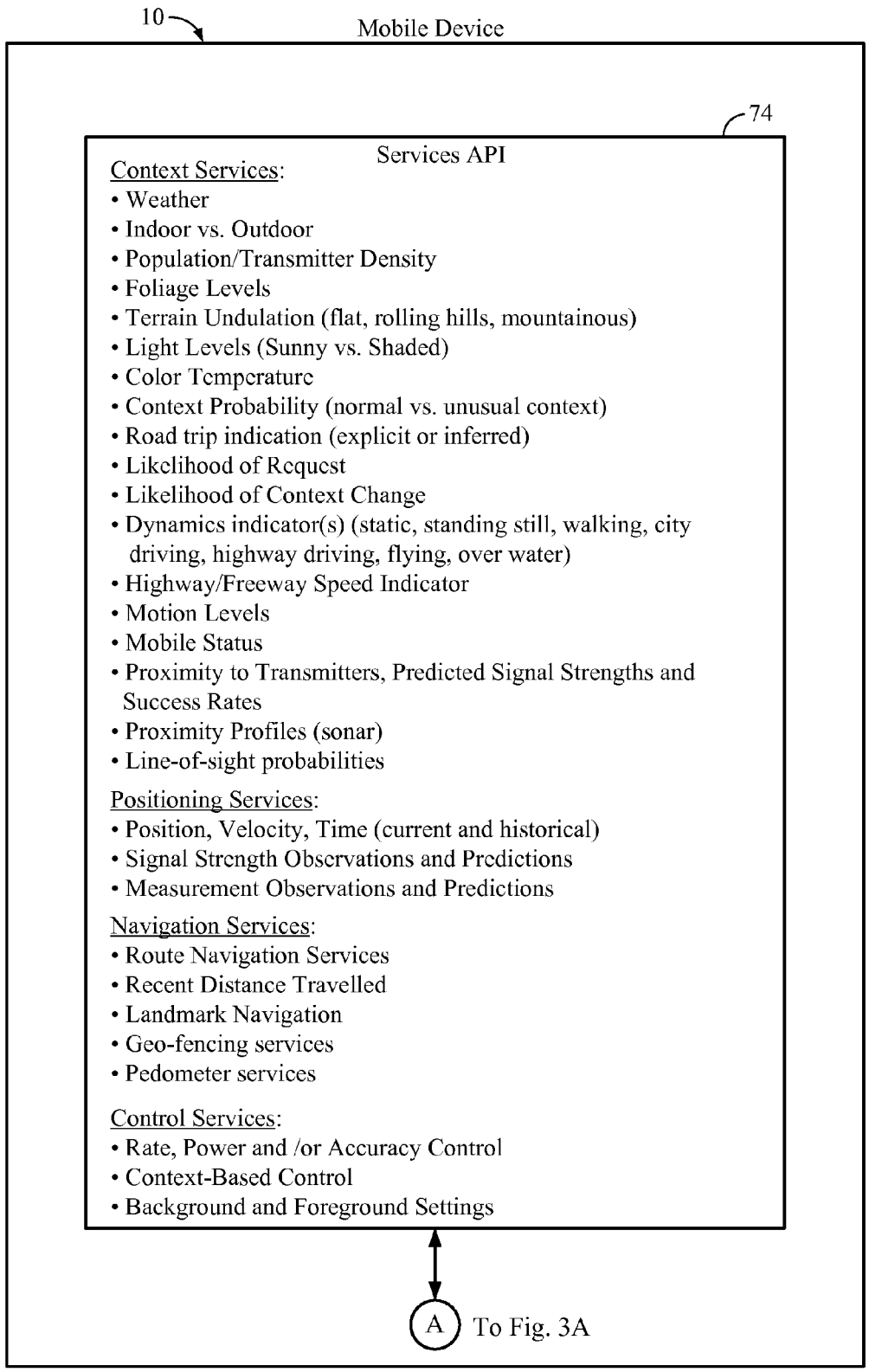
Figure 3C:
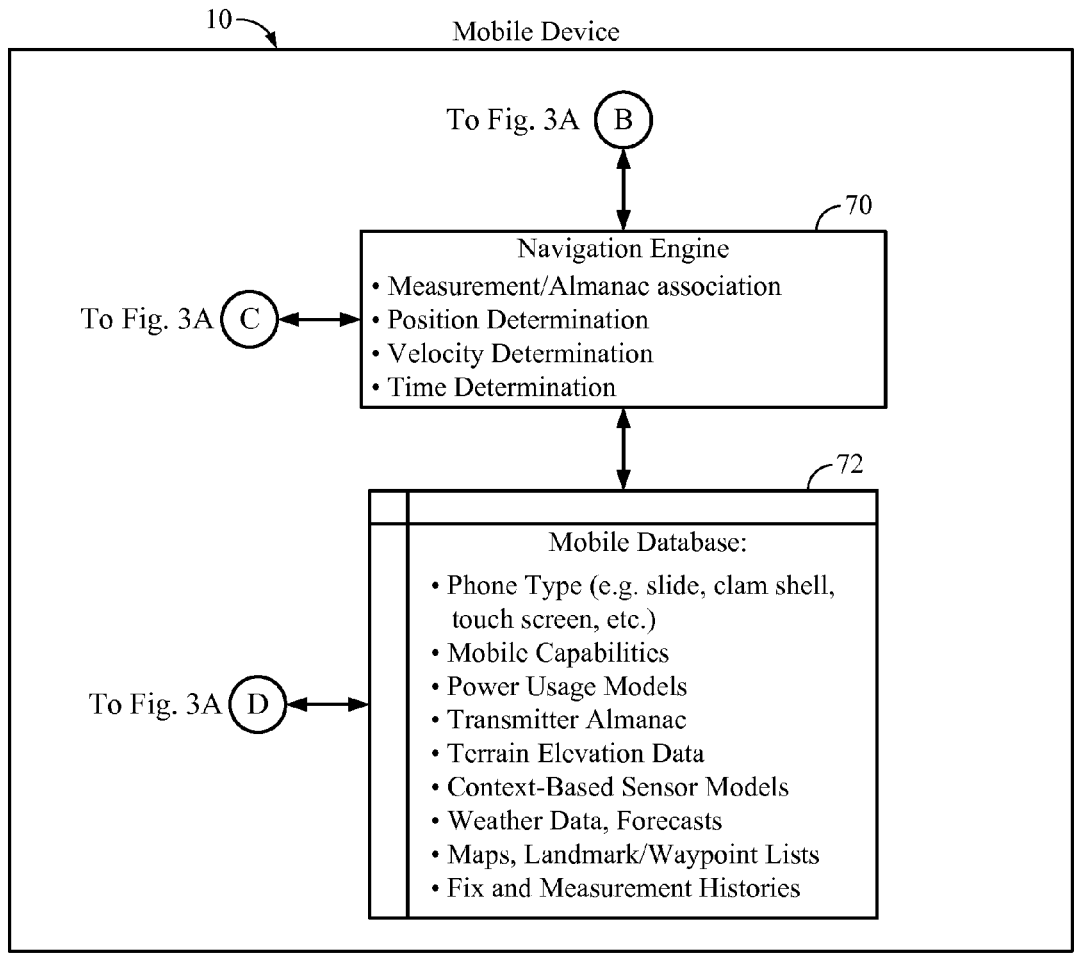
Figure 3C:
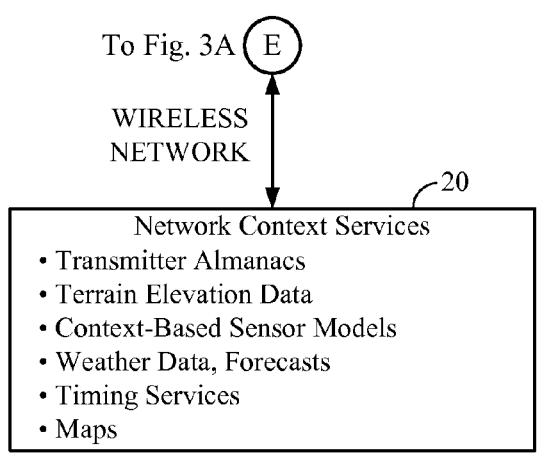

A block diagram of a configuration of a mobile device 10 and its supporting wireless network 20 is shown in FIGS. 3A-3C. FIGS. 3A-3C illustrate examples of functional allocations to enable selecting mobile device operating resources for achieving a desired cost and performance in view of the mobile device's operating context.

The mobile device 10 includes a measurement gathering engine 14. The measurement gathering engine 14 includes a number of measurement generators 50-64, a few examples of which are described for illustration. The measurement generators may include, for example, inertial sensors 50, such as accelerometers, gyroscopes, and the like. The measurement generators may include, for example, radios 52, such as satellite positioning satellite (SPS) radios, terrestrial two-way radios, terrestrial broadcast radios, and the like. The measurement generators may include, for example, an audio microphone 54, speaker 56, camera 58, oscillator/clock 60, or the like. The measurement generator may additionally include, for example, a weather measurement device or instrument 62, to gather information regarding temperature, pressure, humidity, or the like. The measurement generator may also include a mobile state sensor 64 to determine the state of a mobile device. For example, if a phone is open or closed, the activity in which the user is currently engaged (for example, walking, running, driving, flying, and so on), the battery power available, the state of the battery (e.g., charging), the memory available, and so on.

The measurement gathering engine 14 includes a measurement controller 68, which controls, for example, power on or off, rate control, data request fulfillment, status checks, or the like. The measurement controller 68 communicates with the context awareness engine 12.

In the configuration illustrated, the context awareness engine 12 continuously maintains awareness of a number of context factors. Several possibilities are described for illustration. For example, the context awareness engine 12 may maintain awareness of the position and velocity of the mobile device 10. It may also maintain awareness of time determination services and environment characterization services. It may maintain awareness of the availability of navigation measurements and accuracy prediction associated with the navigation measurements. The context awareness engine 12 may also contain control logic to evaluate specific environmental measurements and perform data analysis of certain measurements. It may maintain control of location and measurement histories obtained in navigation applications and provide management of network uploads and downloads.

The context awareness engine 12 receives network support from the wireless network 20. Thus, network context services may be provided or obtained from the wireless network 20 including, for example, transmitter almanacs, terrain elevation data, context-based sensor models, weather data, weather forecasts, timing services, maps, and the like. Of course, a myriad of other context services may be available, as well.

In one configuration, the almanac contains statistics about the presence of interfering signals. The presence of interference may be noted by mobile devices and used in updating their individual almanacs. These interference observations may also be sent to a network entity for update of the aggregated almanac database. The interference statistics may be used by the mobile device to establish the likelihood of receiving a reliable signal from transmitters in its vicinity, or the usefulness of searching for such a signal.

As shown in FIG. 3C, a navigation engine 70 is provided in communication with the context awareness engine 12. The navigation engine 70 may, for example, provide distance measurement and almanac associations, as well as position, velocity, and time determinations. The navigation engine may also support geo-fencing applications.

The context awareness engine 12, as well as the navigation engine 70, are in communication with a mobile database 72, as shown in FIG. 3C. The mobile database 72 contains specific information about the mobile device. For example, the mobile database 72 may contain information concerning the type of phone, such as a slide opening phone, a clam shell phone, a phone with a touch screen, and so on. The mobile database 72 may also contain data describing the capabilities of the mobile device, power usage models, context-based sensor models, and the like. The mobile database 72 may also contain data it has acquired from outside of the mobile device itself, such as transmitter almanac, terrain elevation data, weather data, such as forecasts, temperature, barometric pressure, and the like, maps, landmark or waypoint lists, and so forth. The mobile database 72 may also maintain histories, such as fix and measurement histories, or the like.

As shown in FIG. 3B, a number of service APIs are illustrated in box 74 as being accessible by the context awareness engine 12. In the illustrated configuration, for example, the service APIs may include context APIs, positioning APIs, navigation APIs, control APIs, and the like. Numerous other API services may be accessible, depending on the capabilities of the mobile device, the needs of the user, and so on.

Context service APIs may include, for example, APIs to determine or infer weather or the location type of the mobile device.

Positioning service APIs may include, for example, APIs to determine position; velocity; current time; historical time; signal strength observations and predictions; measurement observations and predictions; and the like.

Navigation Service APIs may include, for example, APIs to determine route navigation services that may be available such as recent distance traveled; landmark navigation; geo-fencing services; pedometer services; control services; rate, power, or accuracy control; context-based control services; background and foreground settings; and the like.

Control Service APIs may include, for example, APIs to control the background and foreground of the mobile device, the power used by the mobile device, etc.

The context of a mobile device extends beyond accuracy requirements, but also includes performance goals or thresholds related to battery state, storage and communications resources, and the like. For example, in determining a current context of a camera phone, a photograph taken by the camera phone may be analyzed for color temperature. The analysis may take into account the time of day and local weather, both of which may be freely available information. Nevertheless, there is a cost to acquiring the time of day, the weather, operating the camera phone, and actually performing the analysis using the processing or computing capabilities of the camera phone. The cost may be weighed against the potential gain to be achieved, which may be, for instance, determining whether the device is indoors or outdoors. Knowing whether the phone is indoors or outdoors may have a high value for certain applications and a lower value for other applications. The context awareness engine 12 may weigh the value of desired information to a particular application against the cost to obtain that information.

Thus, the context awareness engine 12 continuously solves a series of conditional probability problems over time. For example, if a background navigation application is initiated by the user or another program, given what the context awareness engine 12 currently knows of the mobile state, the context awareness engine 12 makes some determinations. For example, the contact awareness engine 12 determines what available operating resources should be used to meet the desired or required accuracy of the background navigation application, and when and how important it is to know more about other aspects of the context of the mobile device.

More particularly, in order for the context awareness engine 12 to know more about any aspect of the context of the mobile device, it should have a model for the effectiveness of each sensor type. That is, the context awareness engine 12 should know the conditional probability of whether a given sensor type will solve its problems, and at what cost. For example, to assess if a more sensitive search is likely to provide a desired signal accuracy, the probability of finding sufficient WAN phase measurements to sufficiently improve background position accuracy, $P(Aw|Co)$, should be known. These probabilities may be pre-programmed or self-learned on the mobile device. There might be a similar probability for WLAN measurements (e.g., Wi-Fi). We can denote this probability as $P(Al|Co)$.

The mobile device may be equipped with sensors, such as accelerometers, gyroscopes, magnetometers, temperature sensors, pressure sensors and/or humidity sensors. Each of the sensors available to a mobile device has an expected success rate and cost function. These may vary as a function of the desired sensor's sensitivity or rate. Some sensors may have a high initial power consumption followed by lower power consumption, whereas others may only be effective in conjunction with other sensors, thus having a higher operating cost. The context awareness engine 12 may take these factors into account when determining the desired method of operation.

One example is the combination of Wi-Fi and inertial sensors while the mobile device is moving slowly (typically indoors). It may be useful to know if a device is likely to be indoors, so that the mobile may choose to use Wi-Fi and/or inertial sensors over GPS for positioning applications. (Inertial sensors provide an optional smoothing/dead reckoning quality to the positioning context.) However, a Wi-Fi server in the vicinity would provide the almanac for this capability, and there is a cost associated with acquiring and storing the almanac. For purposes of determining whether the resource expenditure is desired, the context awareness engine may amortize the cost of obtaining the information over the time the mobile device is likely to use such information.

In another example, the mobile device may determine a maximum likely mobile speed, given its current context. This maximum speed may be useful for determining the Doppler search space for all transmitter types, including GNSS satellites. Signal searches may use substantially less time and energy if/when their Doppler windows can be narrowed.

A series of cost effectiveness models for each sensor type is provided. The probability that a given sensor or combination of sensors will solve a given problem is known. Given the context of the device, the problems to be solved may be determined with a combination of user input and automatic/adaptive management. For example, at a given time, To, the context awareness engine may be set to maintain a background navigation solution with approximately 1 km accuracy. It may also be asked to alert an application when the mobile device is likely to have moved from indoor to outdoor, or vice-versa. (This sort of information may be used, for example, to adjust screen brightness assuming sufficient power capacity of the device.)

A mobile device may include a measurement generator to provide at least freely available measurement information of the plurality of operating resources. The mobile device may also include an inference engine to generate inferred context information from the freely available measurement information. The mobile device may also include a context awareness engine to access at least one of the freely available measurement information and the inferred context information to determine context conditions of the mobile device. The context awareness engine may also identify at least one of the plurality of operating resources as one or more candidate resources for a service application based on the determined context conditions. The context awareness engine may be configured to evaluate the one or more candidate resources using evaluation metrics to measure at least one of cost and effectiveness of the one or more candidate resources. The context awareness engine may also be configured to select at least one of the one or more candidate resources for use by the service application based on the evaluation metrics. Thus, an application can interface with the context engine, rather than creating its own interface to various devices on the mobile device to determine context of the mobile device.

Figure 4:
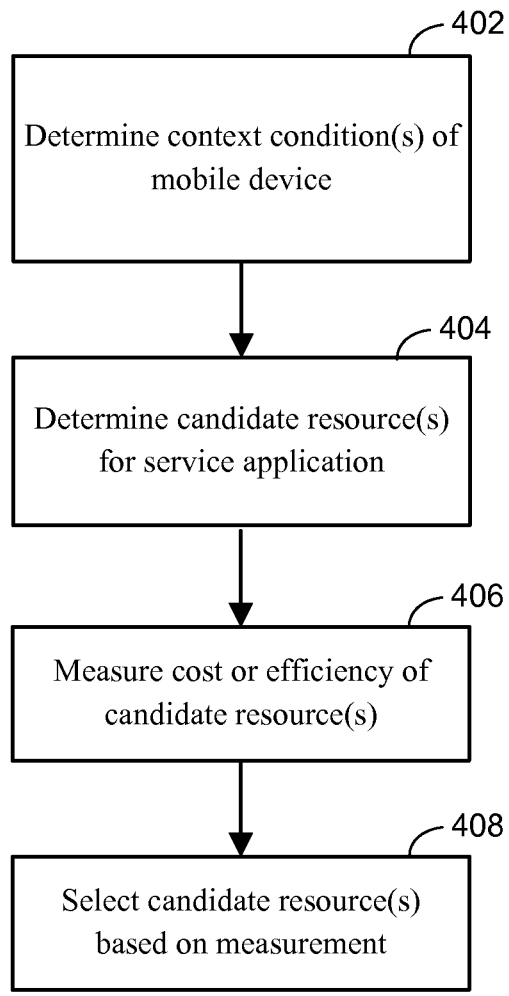
FIG. 4 is a functional block diagram illustrating example blocks, which may be executed by a mobile device to enable selection of mobile device operating resources for optimizing its cost and performance in view of its operating context.

As shown in FIG. 4 a mobile device may execute a method to perform context evaluation for operating resources. As shown in block 402 the mobile device may determine at least one context condition of the mobile device using freely available measurement information of the operating resources and/or inferred context information obtained from the freely available measurement information. As shown in block 404 the mobile device may, upon initiation of a service application, determine at least one candidate operating resource for the service application based on the context conditions. As shown in block 406 the mobile device may measure cost and/or efficiency of the candidate operating resource(s) based on the context conditions. As shown in block 408 the mobile device may select at least one of the candidate operating resources based on the measuring.

Figure 5:
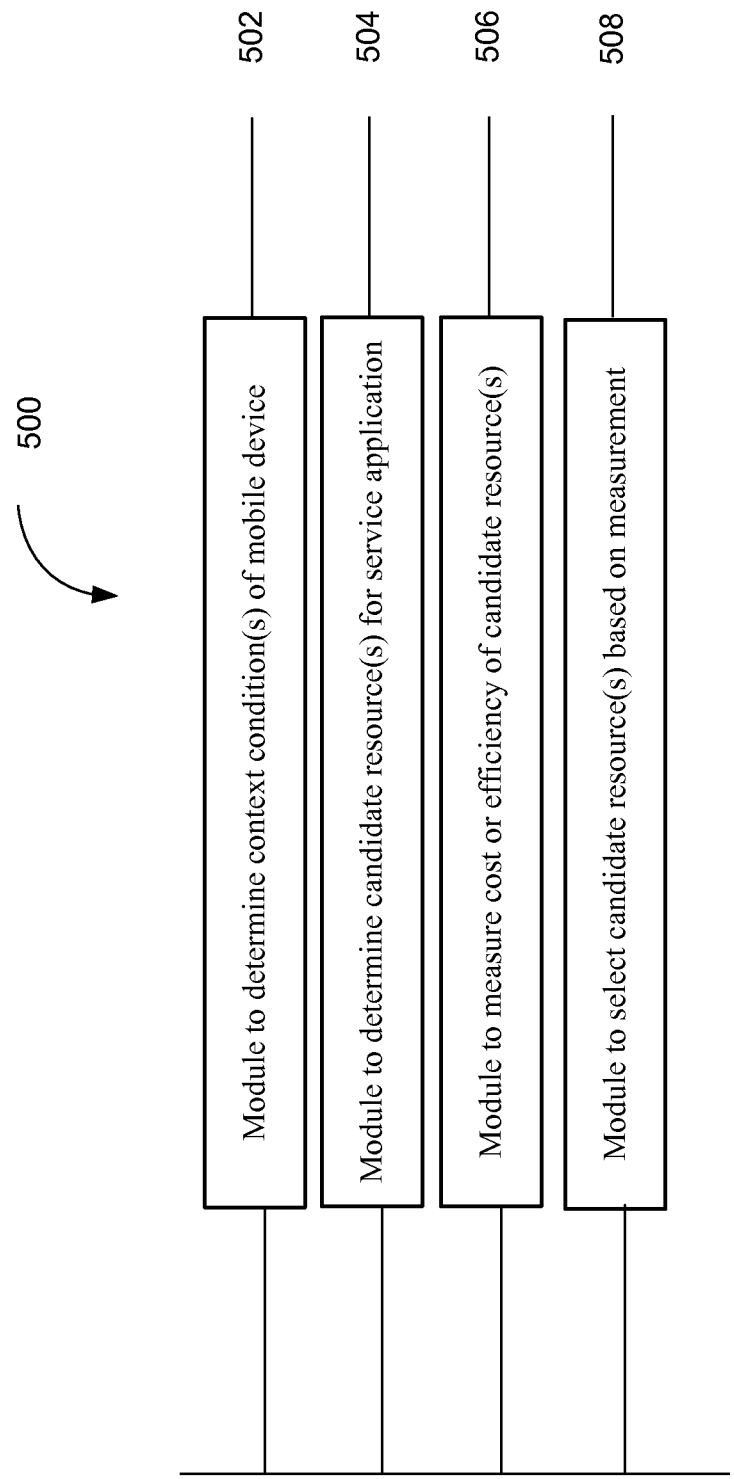
FIG. 5 is a block diagram illustrating components for operating a mobile device according to one aspect of the disclosure.

FIG. 5 shows a design of an apparatus 500 for a mobile device. The apparatus 500 includes a module 502 to determine at least one context condition of the mobile device using freely available measurement information of the operating resources and/or inferred context information obtained from the freely available measurement information. The apparatus 500 includes a module 504 to, upon initiation of a service application, determine at least one candidate operating resource for the service application based on the context conditions. The apparatus 500 includes a module 506 to measure cost and/or efficiency of the candidate operating resource(s) based on the context conditions. The apparatus 500 includes a module 508 to select at least one of the candidate operating resources based on the measuring. The modules in FIG. 5 may be processors, electronics devices, hardware devices, electronics components, logical circuits, memories, software codes, firmware codes, etc., or any combination thereof.

In one configuration, an apparatus, for example a mobile device for wireless communication includes means for determining at least one context condition of the mobile device. In one aspect, the aforementioned means may be the measurement gathering engine 14, measurement generators 50, 52, 54, 56, 58, 60, 62, or 64, navigation engine 70, mobile database 72, network context services 20, services API 74, application 32, operating resources 34, freely available measurements 18, context awareness engine 12, inference engine 40, evaluation metrics 44, measurement control block 68, and/or the module 504 configured to perform the functions recited by the aforementioned means. The apparatus may also include means for, upon initiation of a service application, determining at least one candidate operating resource for the service application based on the context conditions. In one aspect, the aforementioned means may be the services API 74, context awareness engine 12, evaluation metrics 44, application 32, resource selector 36, and/or the module 504 configured to perform the functions recited by the aforementioned means.

The apparatus may also include means for measuring cost and/or efficiency of the candidate operating resource(s) based on the context conditions. In one aspect, the aforementioned means may be the measurement gathering engine 14, context awareness engine 12, evaluation metrics 44, inference engine 40, and/or the module 506 configured to perform the functions recited by the aforementioned means. The apparatus may also include means for selecting at least one of the candidate operating resources based on the measuring. In one aspect, the aforementioned means may be the context awareness engine 12, resource selector 36, and/or the module 508 configured to perform the functions recited by the aforementioned means. In another aspect, the aforementioned means may be a module or any apparatus configured to perform the functions recited by the aforementioned means.

The methodologies described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and does not refer to transitory propagating signals. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions Although the disclosure has been described and illustrated with a certain degree of particularity, it should be understood that the present disclosure has been made by way of example only, and that numerous changes in the combination and arrangement of parts may be resorted to without departing from the spirit and scope of the disclosure, as hereinafter claimed.

What is claimed is:

1. A mobile device configured to access a plurality of operating resources, the mobile device comprising:
    a measurement generator to provide at least freely available measurement information of the plurality of operating resources;
    an inference engine to generate inferred context information from the freely available measurement information; and
    a context awareness engine to access at least one of the freely available measurement information and the inferred context information to determine context conditions of the mobile device and to identify at least one of the plurality of operating resources as one or more candidate resources for a service application based on the determined context conditions, the context awareness engine being configured to evaluate the one or more candidate resources using evaluation metrics to measure at least one of cost and effectiveness of the one or more candidate resources, to select at least one of the one or more candidate resources for use by the service application based on the evaluation metrics, and to provide the service application with at least one of the resources of the mobile device,
    wherein the freely available measurement information includes at least one of:
    a data accuracy measurement;
    an identification of a transmitter associated with the mobile device;
    received signal strength information; or
    received signal phase information.

2. The mobile device of claim 1 in which the plurality of operating resources comprise a navigation engine configured to generate navigation information.

3. The mobile device of claim 2 in which the navigation information comprises at least one of position information, velocity information, and time information.

4. The mobile device of claim 1 in which the plurality of operating resources comprise a battery, and the freely available measurement information comprises power capacity information of the battery.

5. The mobile device of claim 1 in which the plurality of operating resources includes a memory, and in which the freely available measurement information comprises an available data storage capacity associated with the memory.

6. The mobile device of claim 1 in which the plurality of operating resources includes communication resources available to the mobile device.

7. The mobile device of claim 1 in which the mobile device includes a memory storing at least one of:
    type information associated with the mobile device;
    information associated with mobile device capabilities;
    at least one power usage model of the mobile device;
    at least one fix history of the mobile device;
    location type information;
    terrain elevation data information; and
    at least a portion of a base station almanac.

8. The mobile device of claim 7 in which the base station almanac is at least partially self-learned by the mobile device.

9. The mobile device of claim 7 in which the base station almanac is provided by a wireless network server.

10. The mobile device of claim 7 in which the location type information includes at least one location type selected from a group consisting of indoors, outdoors, in a vehicle, and in a multipath signal environment.

11. A method of operating a mobile device configured to access a plurality of operating resources, the method comprising:
    determining at least one context condition of the mobile device using at least one of freely available measurement information of the plurality of operating resources and inferred context information obtained from the freely available measurement information;
    upon initiation of a service application, determining at least one candidate operating resource for the service application based on the context conditions;
    measuring at least one of cost and efficiency of the at least one candidate operating resource based on the context conditions;
    selecting at least one of the candidate operating resources based on the measuring; and
    providing the service application with at least one of the operating resources of the mobile device,
    wherein the freely available measurement information includes at least one of:
    a data accuracy measurement;
    an identification of a transmitter associated with the mobile device;
    received signal strength information; or
    received signal phase information.

12. A mobile device configured to access a plurality of operating resources, the mobile device comprising:
- means for determining at least one context condition of the mobile device using at least one of freely available measurement information of a plurality of operating resources and inferred context information obtained from the freely available measurement information;
- means for determining at least one candidate operating resource for the service application based on the context conditions, upon initiation of a service application;
- means for measuring at least one of cost and efficiency of the at least one candidate operating resource based on the context conditions;
- means for selecting at least one of the candidate operating resources based on the measuring; and
- means for providing the service application with at least one of the operating resources of the mobile device,
- wherein the freely available measurement information includes at least one of:
- a data accuracy measurement;
- an identification of a transmitter associated with the mobile device;
- received signal strength information; or
- received signal phase information.

13. A computer program product, comprising:
- a non-transitory computer-readable medium having program code recorded thereon, the program code comprising:
  - program code to determine at least one context condition of a mobile device using at least one of freely available measurement information of a plurality of operating resources and inferred context information obtained from the freely available measurement information;
  - program code to determine at least one candidate operating resource for the service application based on the context conditions, upon initiation of a service application;
  - program code to measure at least one of cost and efficiency of the at least one candidate operating resource based on the context conditions;
  - program code to select at least one of the candidate operating resources based on the measuring; and
  - program code to provide the service application with at least one of the operating resources of the mobile device,
- wherein the freely available measurement information includes at least one of:
- a data accuracy measurement;
- an identification of a transmitter associated with the mobile device;
- received signal strength information; or
- received signal phase information.

14. A mobile device configured for wireless communication, comprising:
- at least one processor; and
- a memory coupled to the at least one processor,
- the at least one processor being configured:
  - to determine at least one context condition of the mobile device using at least one of freely available measurement information of a plurality of operating resources and inferred context information obtained from the freely available measurement information;
  - to determine at least one candidate operating resource for the service application based on the context conditions, upon initiation of a service application;
  - to measure at least one of cost and efficiency of the at least one candidate operating resource based on the context conditions;
  - to select at least one of the candidate operating resources based on the measuring; and
  - to provide the service application with at least one of the operating resources of the mobile device,
- wherein the freely available measurement information includes at least one of:
- a data accuracy measurement;
- an identification of a transmitter associated with the mobile device;
- received signal strength information; or
- received signal phase information.

15. The mobile device of claim 14 in which the plurality of operating resources comprise a navigation engine configured to generate navigation information.

16. The mobile device of claim 14 in which the plurality of operating resources comprise a battery, and the freely available measurement information comprises power capacity information of the battery.

17. The mobile device of claim 14 in which the plurality of operating resources includes communication resources available to the mobile device.

18. The mobile device of claim 14 in which the memory stores at least one of:
- type information associated with the mobile device;
- information associated with mobile device capabilities;
- at least one power usage model of the mobile device;
- at least one fix history of the mobile device;
- location type information;
- terrain elevation data information; and
- at least a portion of a base station almanac.

* * * * *